(12) United States Patent
Wang et al.

(10) Patent No.: US 7,761,411 B2
(45) Date of Patent: Jul. 20, 2010

(54) DELTA OPERATIONS ON A LARGE OBJECT IN A DATABASE

(75) Inventors: Shaoyu Wang, Rock Hill, NY (US); Amit Ganesh, San Jose, CA (US); Dheeraj Pandey, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 11/781,103

(22) Filed: Jul. 20, 2007

(65) Prior Publication Data
US 2009/0024578 A1 Jan. 22, 2009

(51) Int. Cl.
G06F 17/00 (2006.01)
(52) U.S. Cl. ..................................................... 707/609
(58) Field of Classification Search ................ 707/609, 707/999.001, 999.01, 999.1, 999.2
See application file for complete search history.

(56) References Cited

U.S. PATENT DOCUMENTS

| 5,983,213 A | 11/1999 | Nakano et al. |
| 5,999,943 A * | 12/1999 | Nori et al. ................ 707/104.1 |
| 6,061,678 A | 5/2000 | Klein et al. |
| 6,144,970 A | 11/2000 | Bonner et al. |
| 6,738,790 B1 | 5/2004 | Klein et al. |
| 6,836,778 B2 | 12/2004 | Manikutty et al. |
| 2005/0234868 A1 | 10/2005 | Terek et al. |

FOREIGN PATENT DOCUMENTS

WO WO 2006/009664 1/2006

OTHER PUBLICATIONS

Oracle Database Application Developer's Guide—Large Objects 10g Release 2 (10.2), Part No. B14249-01, 2005, available at http://web.njit.edu/info/oracle/DOC/appdev.102/b14249.pdf, pp. 306.

(Continued)

*Primary Examiner*—Fred I Ehichioya
(74) *Attorney, Agent, or Firm*—Silicon Valley Patent Group LLP; Omkar Suryadevara

(57) ABSTRACT

A computer modifies data inside a database large object (LOB) of unknown structure without modifying other data in the remainder of the LOB. Insertion of new data at a specified location in the LOB does not require movement of existing data in the LOB. Instead, the computer is programmed to insert new data at a physical end of the LOB, and modify metadata based on the specified location. Similarly, deletion of existing data from a specified location in the LOB is performed without movement of other data in the LOB, by updating the metadata. The computer uses the metadata when reading from the LOB, so that the new data is automatically read whenever the specified location is accessed. The computer may optionally output a handle that is static, relative to other insertions and deletions, to identify specific data within the LOB, for use in building indexes on the LOB.

14 Claims, 11 Drawing Sheets

OTHER PUBLICATIONS

Oracle Database PL/SQL Packages and Types Reference, 10g Release 2 (10.2), Part No. B14258-01, 2005, available at http://web.njit.edu/info/oracle/DOC/appdev.102/b14258.pdf, Chapter 52, pp. 66.

Krishnaprasad M. et al., "Towards an Industrial Strength SQL/XML Infrastructure", Proceedings of the 21st International Conference on Data Engineering (ICDE 2005), 10 pgs.

PCT/US2008/070564, Invitation to Pay Additional Fees and Communication Relating to Results of Partial International Search, dated Dec. 29, 2008, 5 pages.

PCT/US2008/070564, International Search Report, dated Sep. 3, 2009, 6 pages.

PCT/US2008/070564, Written Opinion, dated Sep. 3, 2009, 8 pages.

* cited by examiner

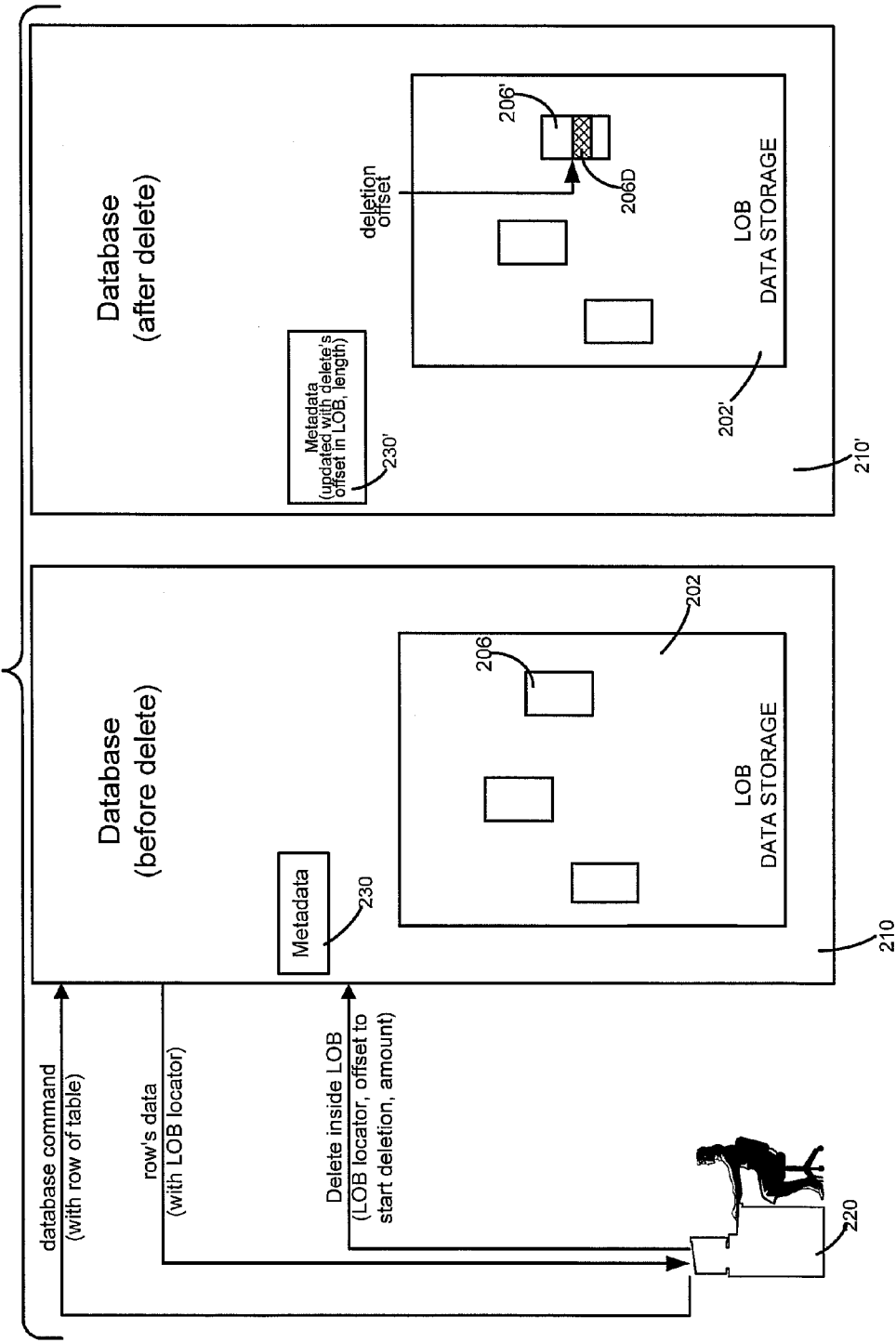

DELTA OPERATIONS ON A LARGE OBJECT IN A DATABASE

BACKGROUND

Use of large objects (LOBs) in relational databases is well known. LOBs are a set of datatypes that are designed to hold very large amounts of text or binary (raw) data. With current technology, a LOB can hold up to a maximum size ranging from 8 terabytes to 128 terabytes depending on how a database is configured. For more information on LOBs, see, e.g. Oracle Database Application Developer's Guide—Large Objects 10 g Release 2 (10.2), Part No. B14249-01, published in 2005 that is incorporated by reference herein in its entirety as background. Also see Oracle Database PL/SQL Packages and Types Reference, 10 g Release 2 (10.2), Part No. B14258-01, published in 2005 which is also incorporated by reference herein in its entirety as background. As described in such documentation, an XML document can be stored unparsed (as a character or byte sequence of unknown structure) in a LOB column of a database.

U.S. Pat. No. 5,999,943 is hereby incorporated by reference herein in its entirety as background. This patent teaches performing operations on large objects (LOBs) in a database. In such a prior art system, a server computer 10 (FIG. 1) receives from a client computer 20 a command (or query) to be performed on a relational database. The command typically identifies a row of a table (e.g. based on user input). The table in the database includes a column that contains LOBs. Server computer 10 is typically programmed with software (e.g. supporting PL/SQL) to respond by sending to client computer 20 a first set of data from the row in the database. The first set of data includes a locator for a LOB that belongs in the LOB column of the identified row. The locator includes a LOB identifier that uniquely identifies the LOB, and snapshot information that identifies a particular version of the LOB. Thereafter, server 10 may receive from client 20 a request to perform an operation on the LOB. The request may be made in conformance with an application programming interface (LOB API) that requires passing the locator for the LOB to server 10. Server 10 performs the requested operation on the particular version of the LOB that is identified in snapshot information contained in the locator passed to server 10 by client 20.

Changes made in response to an update to a particular LOB chunk by server 10 are illustrated on the right side of FIG. 1, by use of an apostrophe after a reference numeral. In the illustrated example of FIG. 1, a LOB chunk of a LOB with a lobid "LOBID2" is updated by server 10 while performing the above-described operation. By traversing a LOB index built on the column that contains the LOB, an appropriate index entry 104 associated with LOBID2 is found. The index entry 104 includes a pointer 112 that indicates that a chunk block 106 within LOB data storage 102 is the most current version to be updated.

According to U.S. Pat. No. 5,999,943, to perform a LOB operation, server 10 reads a current version of data from a LOB's chunk, from chunk block 106 identified by the pointer 112, followed by modification of the data in volatile memory, and followed by storing back to a different location 108 in LOB data storage 102. A pointer 112 in index entry 104 is modified by server 10 to point to chunk block 108 containing the updated version of the LOB. Because pointer 112 is updated to be new pointer 112', the next time index entry 104 is used to access that particular data, the updated version of the data is accessed at chunk block 108, rather than an old version of the data that remains in chunk block 106.

A similar system is disclosed in U.S. Pat. No. 6,738,790 granted to Klein et al. that is directed to accessing a large object that belongs to a cell in a table. See also U.S. Pat. No. 6,836,778 that describes storing XML documents as LOBs in a database. Both these patents are incorporated by reference herein in their entirety as background.

To the inventors' knowledge, prior art related to LOB operations requires that everything after a portion that is modified in a LOB needs to be rewritten if the modified portion is larger than the original portion. Therefore, the inventors find it desirable to improve the operations related to changing of a LOB whose structure is not known.

SUMMARY

A computer is programmed in accordance with the invention to modify data inside a database large object (LOB) whose structure is not known, without modifying other data in the remainder of the LOB. Hence, insertion of new data at a specified location in the LOB does not require movement of any existing data in the LOB. Instead, the computer is programmed to insert new data at a physical end of the LOB. The computer is further programmed to modify metadata for the LOB, based on the specified location. Similarly, deletion of existing data from a specified location in the LOB is performed without movement of other data in the LOB, by updating the metadata. The computer uses the metadata to read from the LOB, so that the new data is read whenever the specified location is accessed (e.g. via a "snapshot" offset).

The computer may be further programmed in some embodiments to optionally output a handle (e.g. a "mark" offset) to identify data within the LOB. The handle is designed to be static relative to other insertions and deletions in the LOB. Hence, the handle is used by application(s) in a client computer to build indexes of data in the LOB. For example, such a handle uniquely identifies data of interest to the client, regardless of the number and location of insertions and/or deletions in the remainder of the LOB.

BRIEF DESCRIPTION OF THE DRAWINGS

FIG. 2C illustrates, in a high level diagram in accordance with the invention, effect on a LOB's data storage in a database, of a command to delete data from an intermediate location within the LOB.

DETAILED DESCRIPTION

Figure 1:
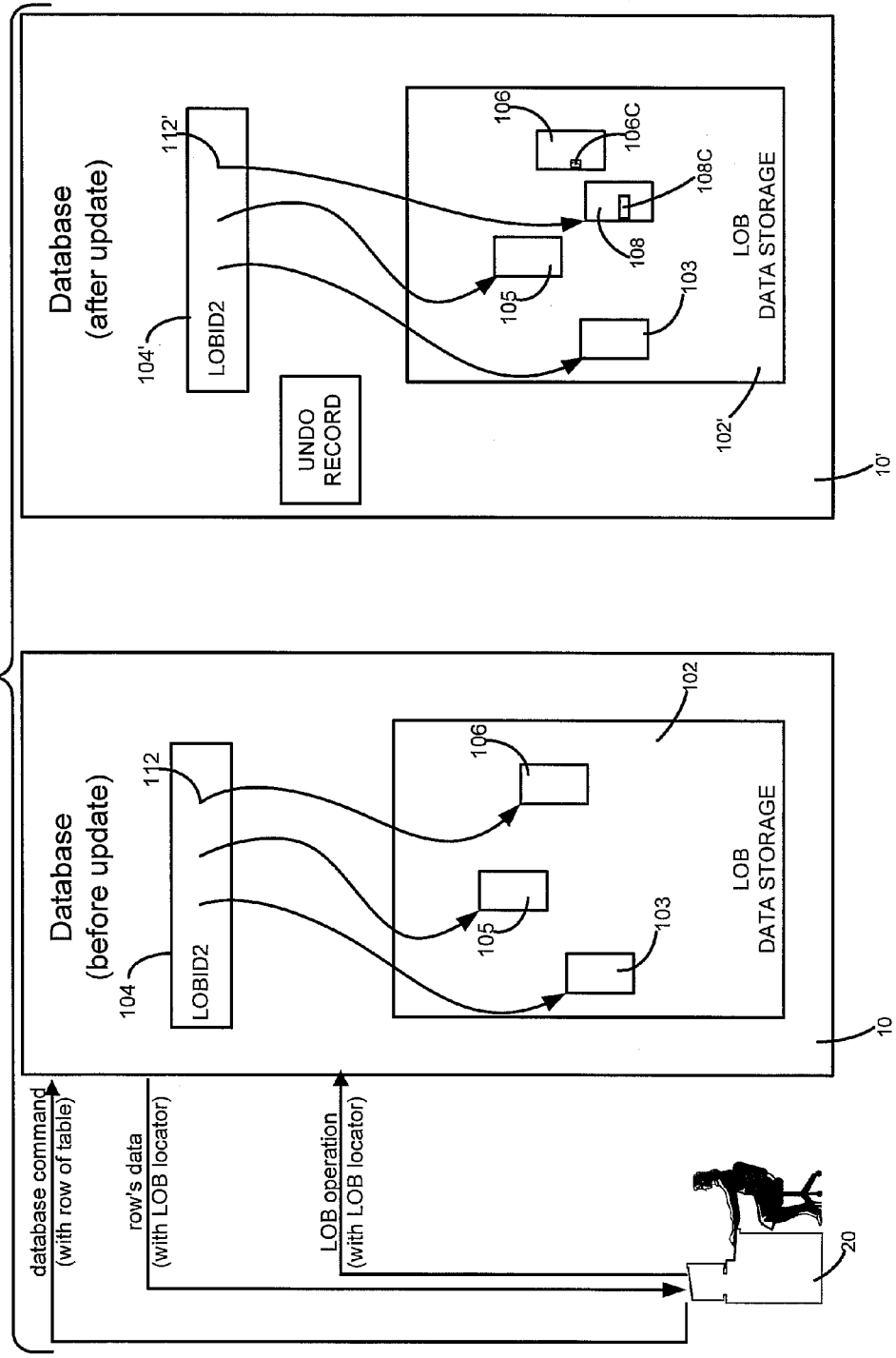
FIG. 1 shows, in a high level diagram, LOB-level operations supported by a database management system of the prior art.
Figure 2A:
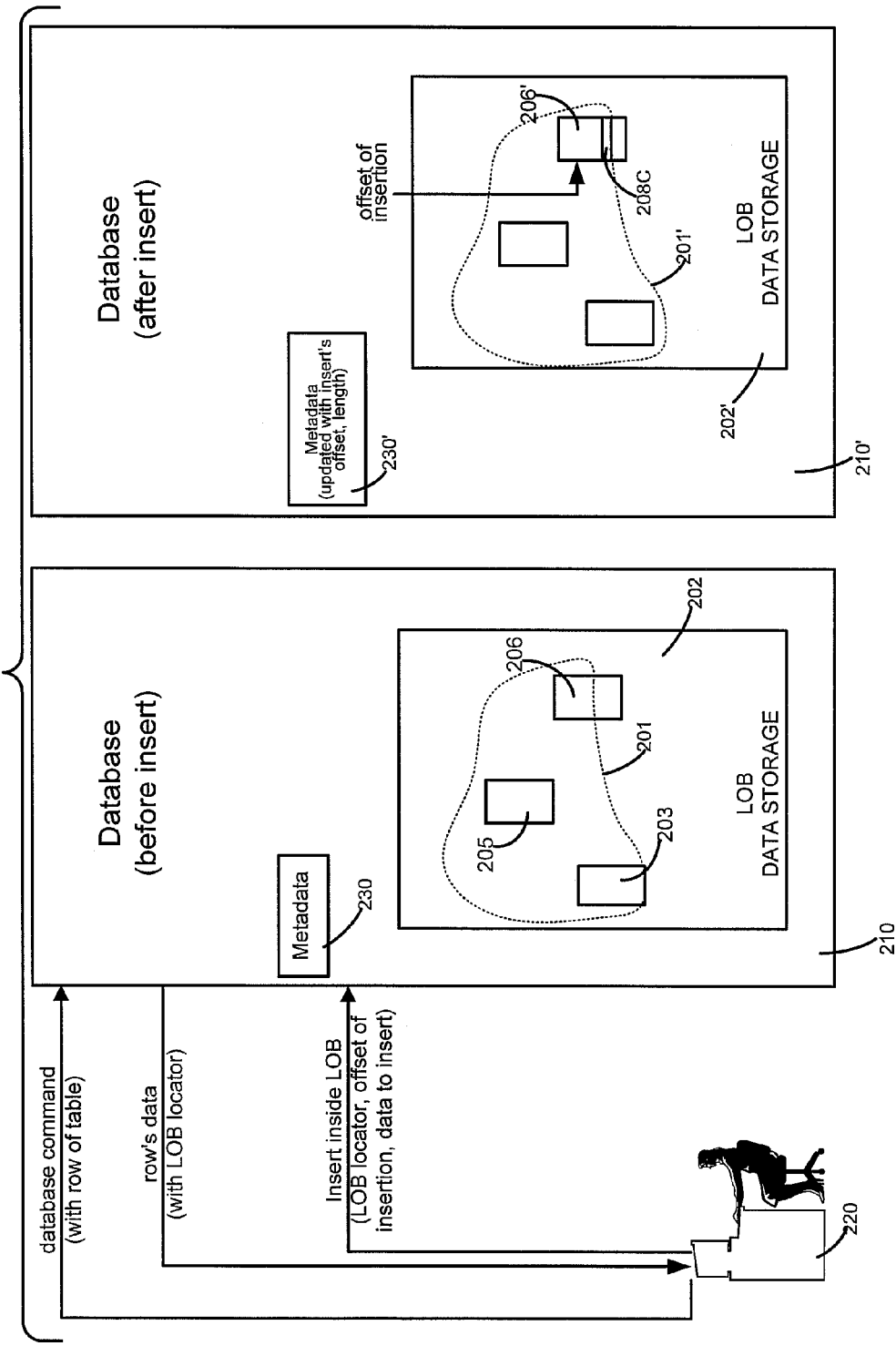
FIG. 2A illustrates, in a high level diagram in accordance with the invention, effect on a LOB's data storage in a database, of a command to insert data at an intermediate location within the LOB.

A server computer 210 (FIG. 2A) is programmed in accordance with the invention to perform an update at any intermediate location inside a LOB data storage 202 without modifying any data in the remainder of LOB data storage 202. LOB data storage 202 holds a large object (LOB) 201 whose internal structure is not known to a relational database within which LOB 201 is stored (in a LOB column therein). Note that FIG. 2A shows several pieces of hardware and/or software that are similar or identical to corresponding pieces shown in prior art FIG. 1, wherein the reference numerals in FIG. 2A are obtained by adding 100 to corresponding reference numerals in FIG. 1.

A client computer 220 (FIG. 2A) may issue a command (e.g. in response to user input) to insert new data, at a location within LOB 201 that is intermediate (relative to a beginning of the LOB and an end of the LOB). The intermediate location at which new data is to be inserted is typically specified by computer 220 as an offset, relative to the beginning of LOB 201. The offset of insertion, which is issued by computer 220, is hereinafter referred to as a "snapshot" offset. In addition to the snapshot offset, computer 220 also identifies the LOB itself (by a LOB locator), the amount of data to be inserted (also called "length"), and further supplies the raw data itself that is to be inserted. Such a command, to operate on a portion of a LOB, is also referred to herein as an "atom."

Depending on the embodiment, computer 220 may be programmed to also issue a delete atom when necessary, for example to delete data from a specified location in the LOB. In some embodiments, the just-described insert and delete atoms are special cases of a "replace" atom that specifies a start position and length of an existing piece of data to be replaced and further specifies new data's length and the new data itself. Detailed description of several atoms and their implementation is provided below in reference to FIG. 4. For further detail, see the Attachments A and B appended below at the end of the detailed description.

A move atom on data within a LOB can be implemented as a delete atom followed immediately by an insert atom, by inserting the piece of data that is deleted from a source location in the LOB into a destination location in the LOB. Depending on the embodiment, each location may be specified as an offset relative to a boundary of the LOB (i.e. relative to a beginning of the LOB or relative to an end of a LOB). Hence, the move atom has two offsets specified, source offset and destination offset, and the length of data portion to be moved. The advantage of specifying a move atom is that, one doesn't need to supply the deleted data portion to an insert atom in an API call, and there is also no data appended to the end of LOB as in an insert atom. Accordingly, some embodiments implement a move atom as a metadata-change-only operation.

Referring to FIG. 2A, server computer 210 is programmed in some embodiments of the invention to respond to an insert atom by appending the new data to be inserted at a physical end of the LOB. Specifically, in database 210' after insertion, LOB data storage 202' is shown in FIG. 2A to be encoded with new data 208C immediately after a last byte within LOB 201, i.e. at the very end (which happens to still fall within block 206 in this illustrative example). In this example, LOB 201' is an enlarged version of LOB 201 which includes the newly inserted data 208C in block 206'.

Note that new data 208C was not inserted at a snapshot offset (e.g. 3.5 KB) that was specified in the insert atom. Insertion of new data at an insert atom's specified snapshot offset is avoided deliberately in several embodiments, to ensure that data already existing in the rest of LOB data storage 202' remains unchanged even after insertion of the new data. Specifically, movement of existing data in LOB data storage 202 is eliminated when new data 208C is stored at any location other than an intermediate location (which is preceded and followed by existing data).

Storing of new data 208C at the end of LOB 201' rather than at the snapshot offset (e.g. 3.5 KB) specified in the insert atom requires extra work when reading the LOB. In many embodiments, the extra work is done by server computer 210 independent of client computer 220. Specifically, server computer 210 automatically modifies certain metadata 230 (FIG. 2A) based on one or more pieces of information in the insert atom, such as the snapshot offset (e.g. 3.5 KB). Moreover, server computer 210 (also called simply "server") uses the updated metadata 230' whenever data is read from the LOB, as described next.

Figure 2B:
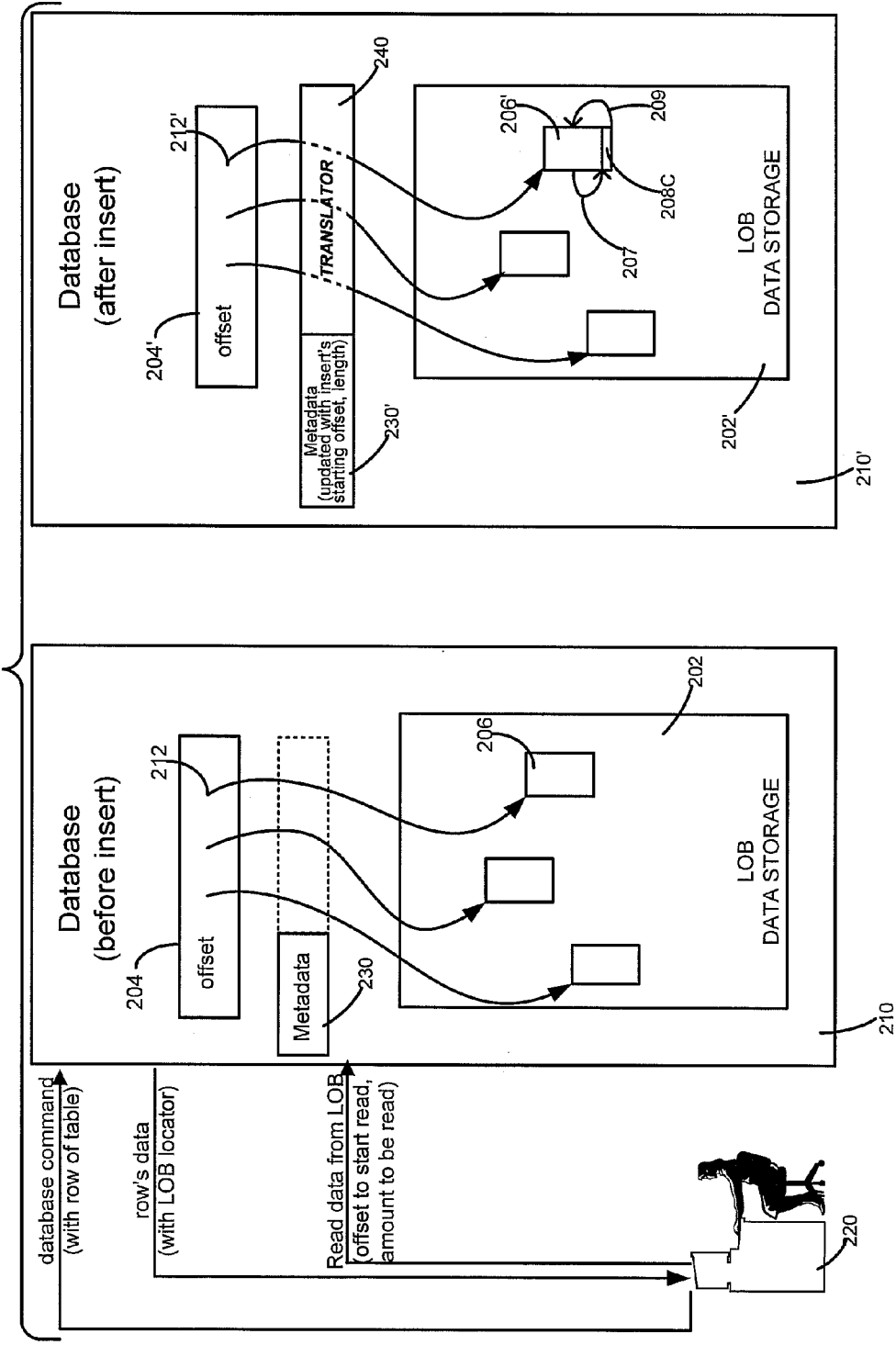
FIG. 2B illustrates, in a high level diagram in accordance with the invention, reading of data from the LOB prior to and after the insert command of FIG. 2B.

Before an insert atom is executed, data is read from LOB data storage 202 in the normal manner, similar to that described above in reference to FIG. 1. Specifically, metadata 230 (FIG. 2B) includes a flag (not shown) which does not require any special processing when accessing the data from LOB data storage 202. Therefore, the snapshot offset specified by client 220 is used to access the LOB 201 in LOB data storage 202.

After the insert atom is executed, the just-described flag is set, which in turn triggers operation of a translator 240 whenever data is to be accessed from LOB data storage 202'. Translator 240 automatically converts a snapshot offset specified in the insert atom into a physical offset at which the data to be read is actually located within LOB data storage 202'. For example, when reading data from block 206' sequentially, the translator maps every snapshot offset to an identical physical offset, until reaching the insert atom's specified snapshot offset (e.g. 3.5 KB). When this value is reached, the snapshot offset is translated (see branch 207 in FIG. 2B) to the physical address at the end of the LOB where the new data 208C is stored. The translator continues in this manner, at increasing values of snapshot and physical offsets, until the end of new data is reached. Thereafter, the translator translates the next snapshot offset to a physical offset which is identical in value to the insert atom's specified snapshot offset (e.g. 3.5 KB), as illustrated by branch 209. Therefore, reading of the LOB 201' continues immediately following the insert atom's snapshot offset. Then the translator continues, at increasing values of snapshot and physical offsets until the LOB is fully read.

Figure 2D:
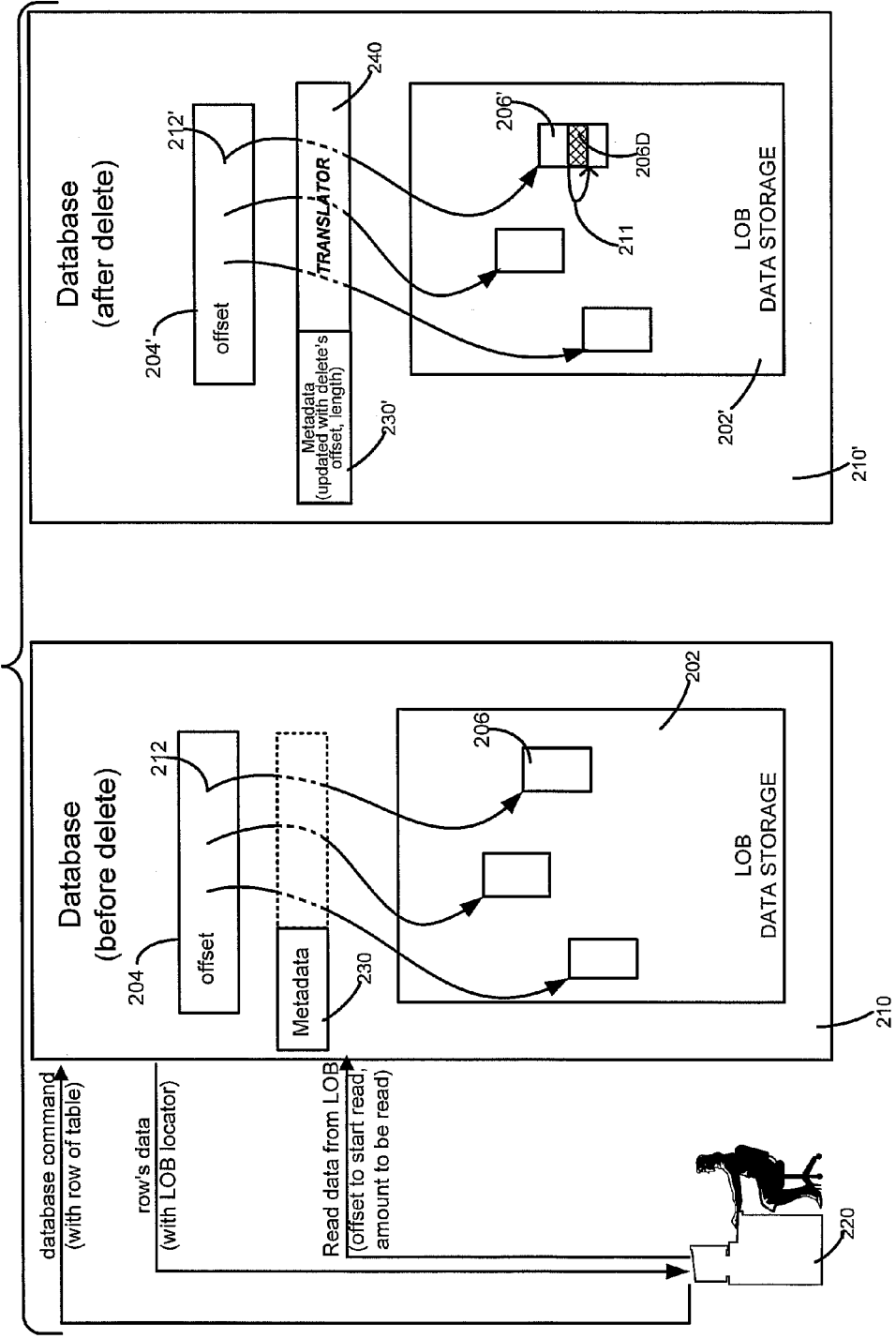
FIG. 2D illustrates, in a high level diagram in accordance with the invention, reading of data from the LOB prior to and after the delete command of FIG. 2C.

Accordingly, by modifying metadata during an insert atom, and by using the metadata to translate a snapshot offset into a physical offset, server 210 is able to avoid movement of any existing data in the LOB during the insert atom. Similarly, deletion of existing data from a specified location in the LOB is performed without movement of other data in the LOB, simply by updating the metadata as shown in FIG. 2C. Moreover, after a delete atom is executed, server 210 reads data from the LOB with a translator ensuring that reading of deleted data is skipped (see branch 211 in FIG. 2D) on accessing the location(s) specified in the delete atom (e.g. via the snapshot offset).

Figure 3A:
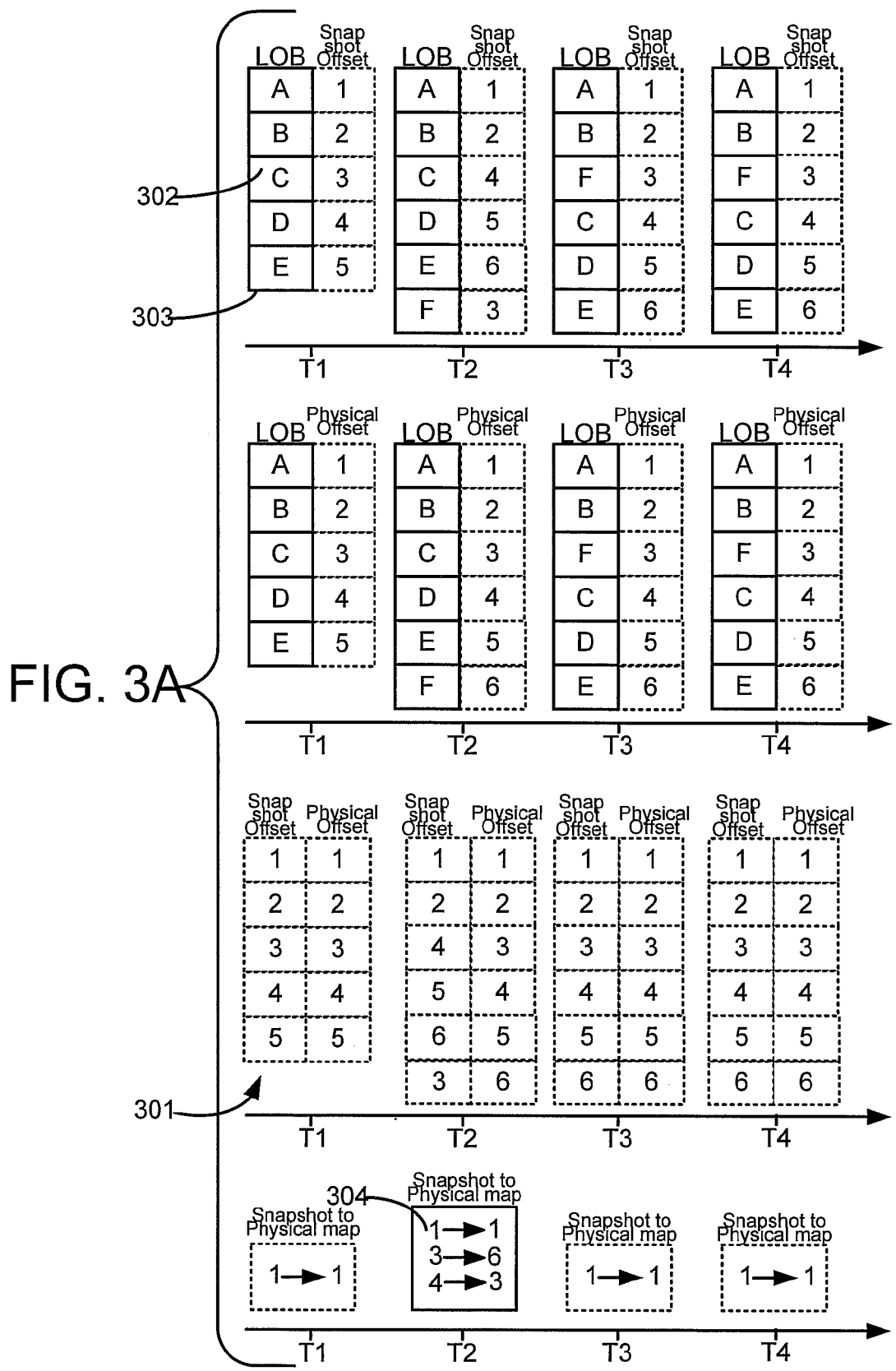
FIG. 3A illustrates changes as a function of time, in a LOB, in a snapshot offset and in a physical offset into the LOB, and in a mapping between the two offsets, for an exemplary sequence of events, wherein at time T2 a new character F is inserted, and at time T3 the LOB is reorganized.

FIG. 3A illustrates in further detail, one exemplary illustration of the use of the two offsets, namely the snapshot offset used by client computer 220 and the physical offset used by server computer 210, as follows. Specifically, at time T1, before any atom has been executed, the two offsets are identical to one another. In the illustrated example of FIG. 3A, the LOB contains the characters A, B, C, D, E, and the snapshot offset is 1, 2, 3, 4, 5 and the physical offset is also 1, 2, 3, 4, 5. Therefore, at time T1, there is an identity of mapping between the two offsets as illustrated at 301.

The identity mapping 301 is represented in some embodiments by a flag in metadata 230' (FIG. 2A) which indicates that no translation is needed to go from a snapshot offset to a physical offset. Alternative embodiments may store in memory a single-entry map (with entry 1→1) shown at the bottom of FIG. 3A. A map's entry is interpreted in many embodiments as an abbreviated representation of a sequence of entries in a "full" map which is of the same size as the LOB, and which maps every character in the LOB. The two offsets in such a sequence of entries have the same relationship to one another, with both incremented by the same amount (so entry 1→2 denotes entries 1→2, 2→3, 3→4, and so on up to the end of the LOB). Also, the total size of a map is same which map is obtained by incrementing each offset by 1. This interpretation keeps the map itself small in size, without the need to have one entry in the map for every byte in the LOB. Furthermore the map is assumed to extend to infinity, which allows the map to remain unchanged in situations where new data is simply appended at the end of the LOB.

Referring back to FIG. 3A, at time T2 server computer 210 receives an insert atom to insert F at snapshot offset 3, i.e. at location 302 which is located immediately after B. Note that C which is currently at location 302 is not to be replaced, and instead F is to be inserted between B and C. To do so, server computer 210 simply inserts F at the end 303 of the LOB. At this stage, i.e. at time T2, snapshot offset 3 refers to F and snapshot offsets 4, 5, 6 respectively refer to C, D, E. So, at time T2, the LOB contains the characters A, B, C, D, E, F and their corresponding physical offset are 1, 2, 3, 4, 5, 6. Accordingly, the snapshot to physical map 304 (see bottom of FIG. 3A) now contains three entries, namely: 1→1, 3→6, 4→3. Such a map is stored in a b-tree data structure in some embodiments, with each snapshot offset in a b-tree leaf or branch being stored relative to its parent. B-tree storage of snapshot offsets allows fast maintenance of offsets, by updating just one path, from a particular entry to the root node.

The computer may be further programmed in some embodiments to automatically perform a re-organization of the information within a LOB, e.g. if one or more predetermined condition(s) indicate that the LOB is too fragmented. Note that the specific conditions indicative of over-fragmentation of a LOB are implementation dependent heuristics, which are not critical aspects of the invention.

During re-organization, all the data in the LOB that is shown by metadata 230' (FIG. 2A) to have been deleted is physically deleted from the LOB. Any holes in the LOB are removed, and remaining data in the LOB is physically arranged in the same sequence as per the snapshot offset. Therefore, at the end of a re-organization, as illustrated at time T3 in FIG. 3A, the LOB of this example contains the characters A, B, F, C, D, E and the two offsets are both of the same value, namely 1, 2, 3, 4, 5, 6. At this stage, the map is again 1→1 as shown at time T3 at the bottom of FIG. 3A.

Note that the above-described reorganization at time T3 did not affect the snapshot offset. The reason is that the physical offset is the one that was changed during the reorganization, as data was shuffled within the LOB. Accordingly, client computer 220 which uses the snapshot offset continues to operate in the normal manner, independent of the reorganization of data within the LOB. For this reason, in many embodiments, LOB data reorganization is performed by server 210 at any convenient time, without notifying client 220.

The server 210 may be further programmed in some embodiments to optionally output a handle (called "mark" offset) to identify data within the LOB. The mark offset is designed to be static relative to the identified data, regardless of other insertions and deletions in the LOB. One can use a mark offset that identifies, for example, an XML node within the LOB, to refer to the same XML node again and again regardless of changes in the rest of the LOB. Hence, mark offsets to certain pieces of data of interest to a client computer 220 remain unchanged even when snapshot offsets of these data pieces change dynamically with time as new data is added and existing data is deleted. Hence, mark offsets are used by application(s) in a client 220 to build indexes to the data of interest in the LOB. Accordingly, a mark offset uniquely identifies data of interest to the client, regardless of the number and location of insertions and/or deletions in the remainder of the LOB.

Figure 3B:
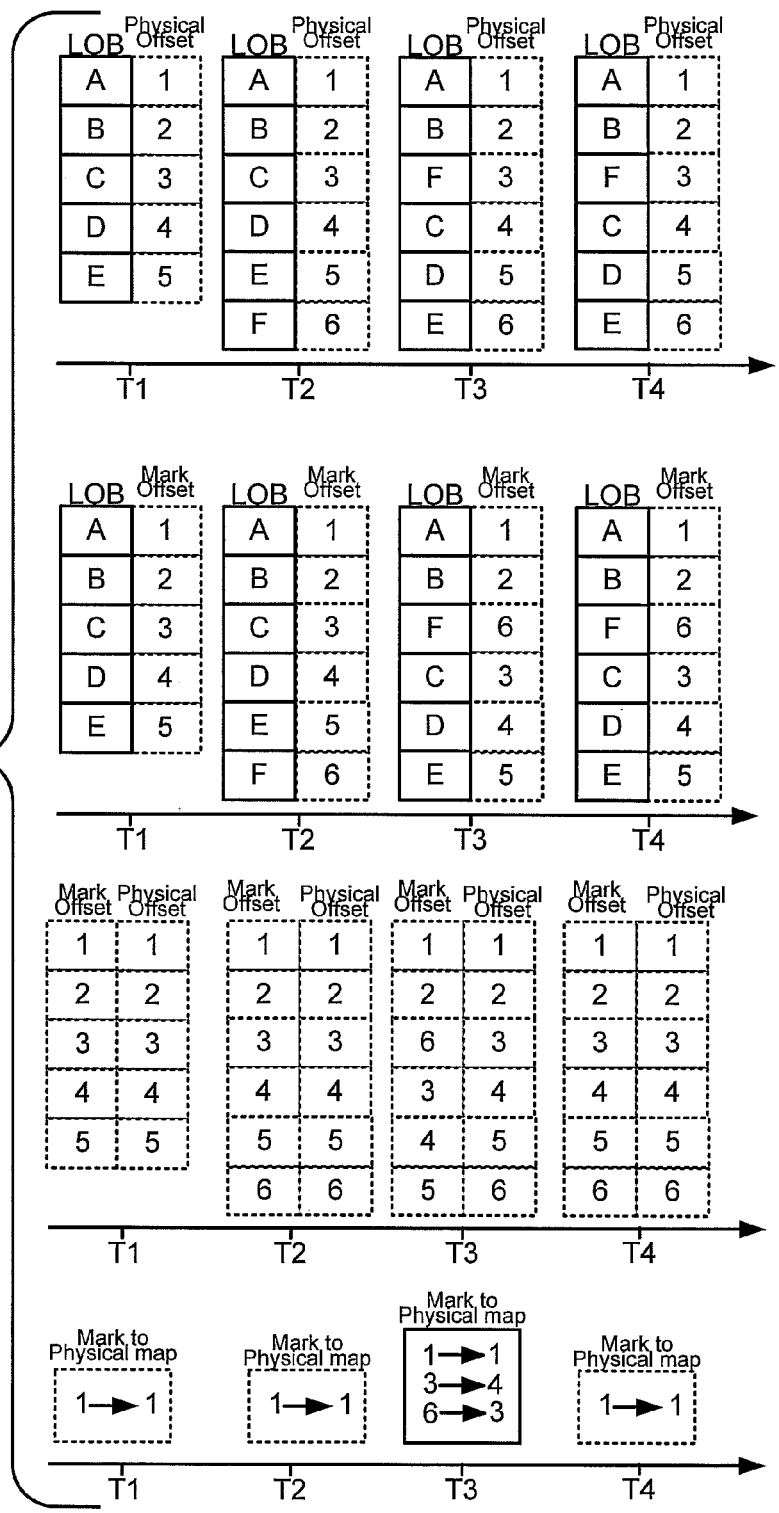
FIG. 3B illustrates changes as a function of time, in the LOB of FIG. 3A and in a mark offset into the LOB, and in a mapping between the mark offset and the physical offset for the sequence of events in FIG. 3A, followed by resetting of the mark offset at time T4.

A mark offset is implemented in some embodiments by use of a temporal sequence in which data enters a LOB. Accordingly, the mark offset can be any monotonically changing sequence number, such as a count that is incremented each time any data is added to the LOB. In one illustrative example, a number indicating a sequence in which a byte/character of data enters the LOB is used as a mark offset. Initially, at the time of LOB creation, mark offsets have the exact same value as the physical offsets as illustrated at times T1 and T2 in FIG. 3B. As shown at the bottom of FIG. 3B, a map of the mark offset to physical offset is an identity map at times T1 and T2. Then, at time T3, LOB reorganization is performed, and the physical location of characters C, D, E, F changes within the LOB, and hence their physical offset changes, but the mark offset remains unchanged (as noted above, the mark offset is based on the time at which each character entered the LOB, which is history and has remained unchanged). Hence, the mark to physical map is no longer an identity map and instead there are three entries, namely: 1→1, 3→4, 6→3.

Although a history notion has been used to introduce the concept of mark offset, note that the mark offsets can be reset, so that the mark-to-physical map becomes same as the snapshot-to-physical map. When such a reset is performed, all history is "forgotten". The reset operation is useful in creating or rebuilding an index on the LOB. Accordingly, when a reset is performed by server computer 210, the client computer 220 is notified. Thereafter, client computer 220 performs a scan of the entire LOB to obtain new mark offsets of all the data pieces of interest, and rebuilds its indexes based on new mark offsets.

Figure 3C:
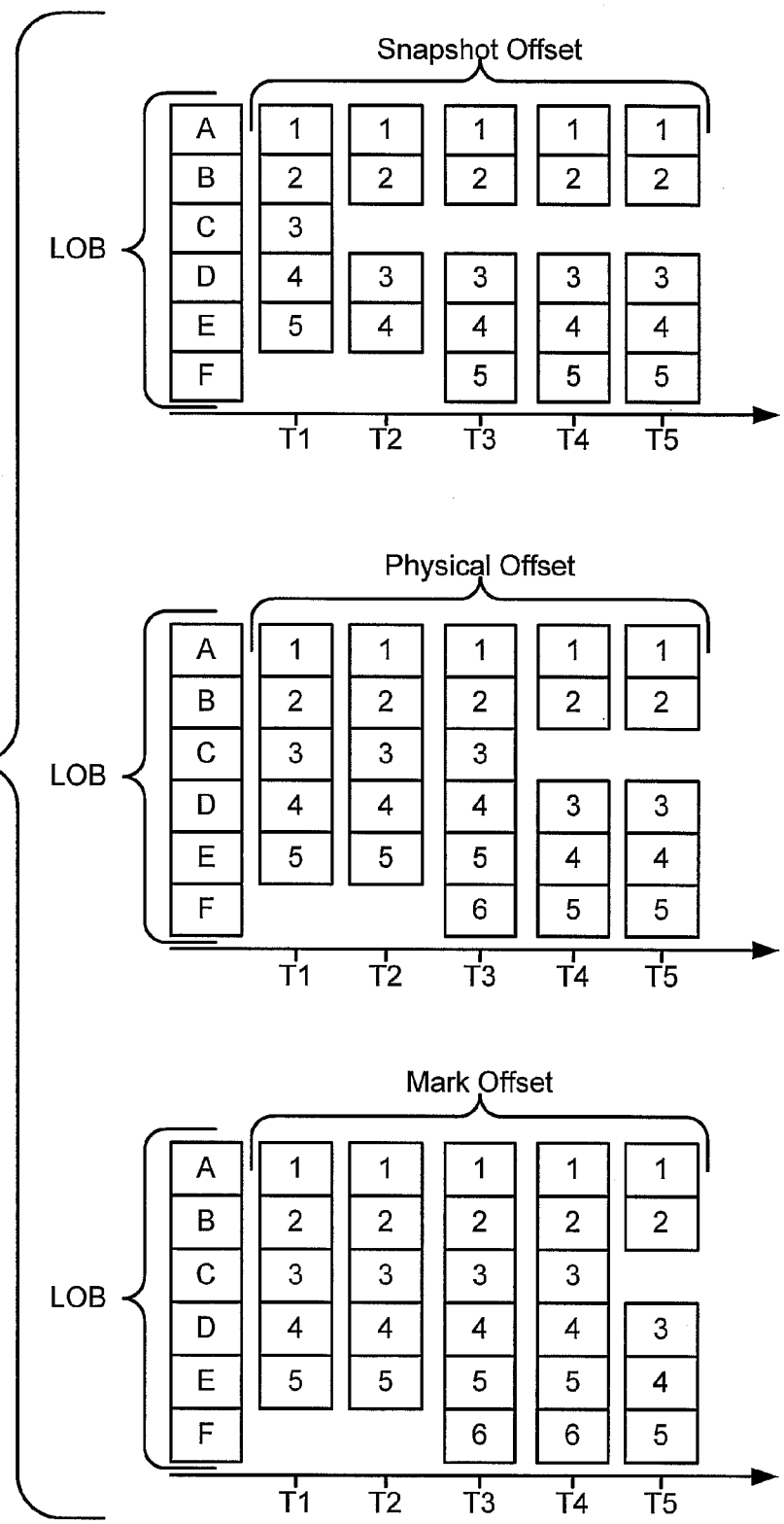
FIGS. 3C and 3D illustrate changes as a function of time, in a LOB, in the snapshot offset, physical offset and mark offset, for two exemplary sequence of events for deletion of character C and for overwriting of character C respectively.
Figure 3D:
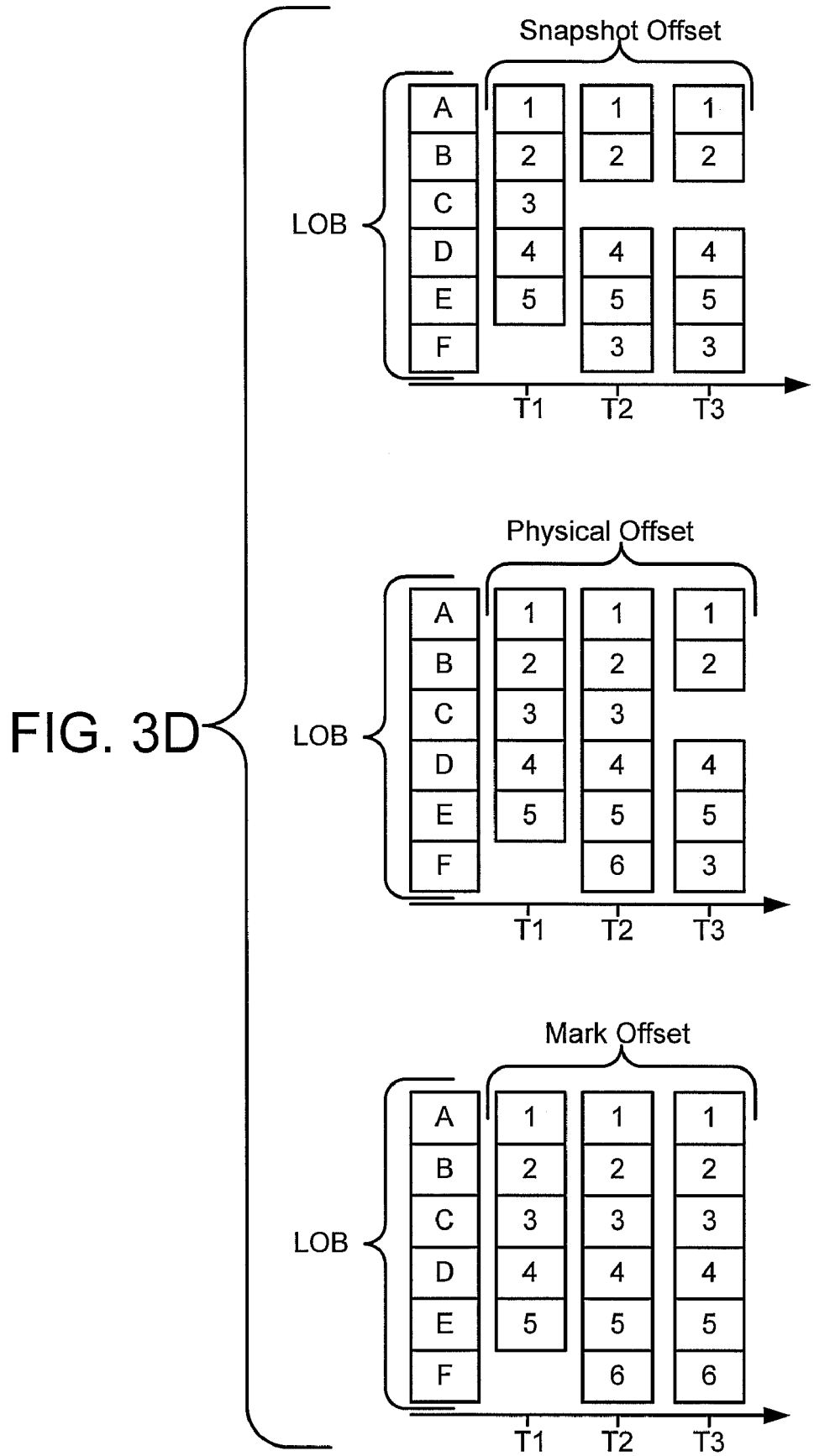

FIG. 3C illustrates changes as a function of time, in a LOB, in the snapshot offset, physical offset and mark offset, for another exemplary sequence of events, wherein at time T2 an existing character C is deleted, at time T3 a new character F is appended, at time T4 the LOB is reorganized, and at time T5 the mark offset is reset. FIG. 3D illustrates another set of changes as a function of time, in a LOB, in the snapshot offset, physical offset and mark offset, for yet another exemplary sequence of events, wherein at time T2 an existing character C is replaced by a new character F, and at time T3 the LOB is reorganized.

Hence, a database management system 400 within a server computer 210 is programmed in some embodiments of the invention to execute various atoms of the type illustrated in FIG. 4 and discussed next.

In response to a delete atom from a client, the system 400 performs a delete function 410 which includes actions 411 and 412. Based on the snapshot offset and length identified in the delete atom, in action 411, system 400 maintains the snapshot-to-physical mapping of the LOB. Such maintenance may require, for example, splitting of a map entry into two entries to effectively omit the deleted data from the map, when the deleted data is covered within a single in the mapping. For example if a single character B is being deleted from the LOB shown at time T2 in FIG. 3C, a single entry in the snapshot to physical mapping e.g. 1→1 is replaced with two entries 1→1 and 3→4, thereby effectively demapping physical offset 3. Additionally, system 400 also maintains in act 412, a length of the LOB in metadata 230 (FIG. 2A), e.g. by reducing the existing length by the deleted data's length. Numerous such actions that are needed to implement a delete atom will be apparent to the skilled artisan in view of this disclosure.

In response to an append atom from a client, system 400 performs an append function 420 which includes actions 421, 422 and 423. In action 421, system 400 looks up the LOB's existing length, e.g. from metadata 230 (FIG. 2A). In action 422, system 400 simply copies the new data to the end of the LOB. Based on the snapshot length identified in the append atom, in action 423, system 400 increases the existing length by the length of the new data being appended, i.e. updates the metadata 230.

In response to an insert atom from a client, system 400 performs an insert function 440 which includes actions 441-445 as follows. Based on the snapshot offset and length identified in the insert atom, in action 441, system 400 maintains the snapshot-to-physical mapping of the LOB. Action 441 is implemented in a manner similar to that discussed above for the delete atom and may require, for example, splitting of a single map entry that covers the snapshot offset at which new data is being inserted. Note that a map entry may be split in action 441 into three entries to effectively insert the new data into the map, when the inserted data is located at the end of the LOB. An example of a single character F being inserted into the LOB has been illustrated at time T2 in FIG. 3A, wherein a single entry in the snapshot to physical mapping e.g. 1→1 was replaced with three entries as shown in map 304 (FIG. 3A). Additionally, system 400 also maintains in act 442, a length of the LOB in metadata 230 (FIG. 2A), e.g. by reducing the existing length by the deleted data's length. In act 443, the system 400 appends the new data to the end of the LOB, e.g. in a write gather cache from which the data is eventually written back to disk.

Moreover, in some embodiments, system 400 may also maintain in act 444, a file offset for use in the next call. File offset is a term used by file system API to allow a client to issue multiple read/write calls without needing to specify offset in each one of them. Accordingly, in some embodiments, an atom is assumed to start from where the last atom left off. This implicit offset is understood as the file offset. Some implementations do not use file offset in the API, which require the client to specify snapshot offset in each atom.

Finally, in act 445, system 400 updates an internal variable which identifies the next mark offset, and thereafter returns to the client a value of this internal variable before insertion of the new data, as a mark offset of the newly inserted data. Note that the internal variable is increased by the length of the new data at the end of act 445, for use in a future insert or append function. Numerous such actions that are needed to implement a delete atom will be apparent to the skilled artisan in view of this disclosure.

Several additional atoms, such as read, write, open, trim/truncate, flush and close are performed by their respective functions 430, 450, 470, 460, 480 and 490 that are implemented by system 400 in a manner similar to that described above. Specifically, in read function 430, system 400 initializes a B-tree range scan on the snapshot to physical mapping in action 431 to find a portion of the B-tree containing snapshot addresses of interest to the client, followed by translating the read call through the snapshot to physical map in action 432 into a series of individual calls (the number of calls into which a single call translates depends on the number of entries in the snapshot to physical map). The translated calls are issued directly to the write gather cache, thereby to read the data from the translated address.

Similarly, in write function 450, system 400 again initializes a B-tree range scan on the snapshot to physical mapping in action 451 to find a portion of the B-tree containing snapshot addresses of interest to the client. Thereafter, if the LOB is a BLOB or a CLOB of fixed width or a NCLOB, system 400 performs action 452 wherein the write call is translated through the snapshot to physical map into a series of individual calls. The translated calls are issued directly to the physical layer of the LOB, thereby to over-write the data at the translated address. If the LOB is a CLOB of varying width, system 400 performs action 432 wherein the write call is treated as a replace call. As noted above, a replace atom can be implemented as a delete atom immediately followed by an insert atom.

Moreover, in trim/truncate function 460, system 400 performs the same actions as in the delete function, namely action 461 is same as action 411 and action 462 is same as action 412. The trim/truncate function is maintained in some embodiments for backward compatibility.

In an open function 470, system 400 initializes the internal variable for the next mark offset, and also initializes another variable which holds the length (both are initialized to the value 0), in the metadata 230 which is maintained for the LOB in a memory of the system 400. The open function 470 is invoked at the very beginning when a LOB is first loaded into the database, e.g. in response to a SQL statement from the client.

In a flush function 480, system 400 checks in action 481 a flag in metadata 230 in the memory of system 400 which indicates whether the LOB has been subject to any update after being loaded into memory (if this flag indicates no update then the snapshot to physical map is an identity map). Next, in action 482, system 400 calls the write gather cache to flush the LOB to disk. Thereafter, system 400 performs a redo generation callback (to generate a redo log for the LOB), and in doing so performs an act 483 to check if the LOB has a metadata change for a fragment component, such as total length, next mark offset, or per-LOB statistics. If so, system 400 generates the appropriate redo entries in the redo log of the database.

In a close function 490, system 400 performs an action 491 to evaluate one or more predetermined conditions which trigger reorganization of the LOB's data. If the condition(s) is/are met, then system 400 registers a post commit callback. Thereafter, when performing the call back function, system 400 performs an act 492 to schedule a background task that is to perform the reorganization. Finally, in a task call back, system 400 performs an act 493 to lock the row in the database that contains the LOB, and if no lock is obtained then aborts this act 493. If the lock is obtained, then system 400 opens the LOB for read/write operations, followed by re-evaluating the one or more predetermined conditions which triggered the reorganization to ensure they are still met and if so, then reorganizes the data in the LOB.

Note that a mark reset is not performed in act 493, which is limited to just reorganization of the LOB's data without informing any client. The reset of the mark to physical mapping is typically performed as a separate function 499, in coordination with one or more client(s) that access the LOB, typically in response to a request from the client(s). Similarly, system 400 also supports translation of the mark offset to snapshot offset via function 498. This translation function is invoked by a client to obtain snapshot offsets for use with the above-described functions e.g. delete, insert, append, write, read etc implemented by system 400. In function 498, system 400 first uses a mark to physical map in metadata 230 to translate the received mark offset into a physical offset and then initiates a scan on the snapshot to physical map to identify the corresponding snapshot offset which is then returned to the client.

Figure 5:
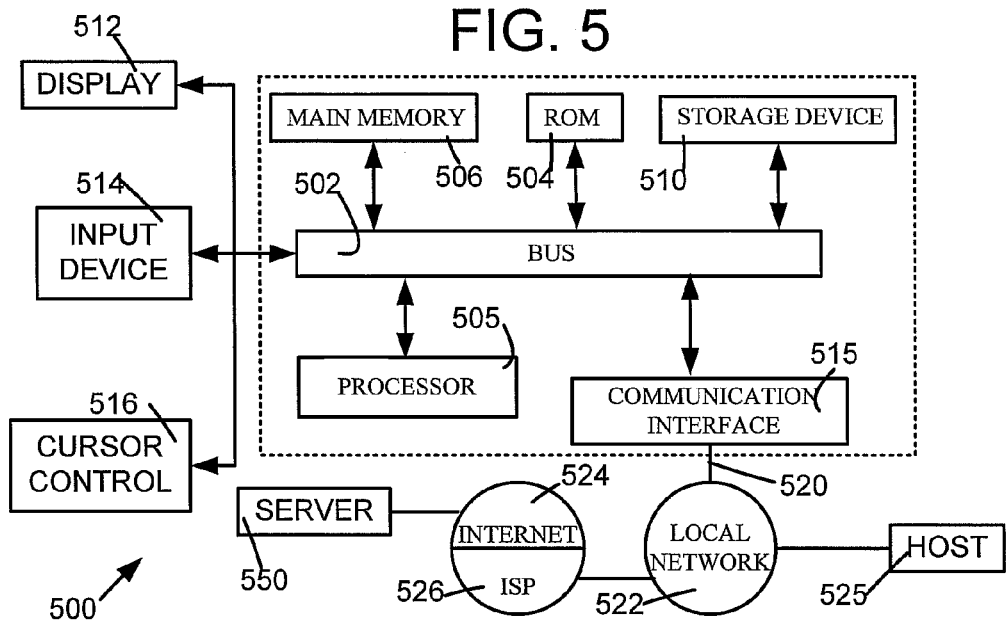
FIG. 5 illustrates, in a high level block diagram, hardware included in a computer that may be used to perform the methods of FIG. 4 in some embodiments of the invention.

Note that a database in server computer 210 may be implemented in some embodiments by use of a computer (e.g. an IBM PC) or workstation (e.g. Sun Ultra 20) that is programmed with a relational database management system (RDBMS) called "Oracle Database", available from Oracle Corporation of Redwood Shores, Calif. Such a computer can be implemented by use of hardware that forms a computer system 500 as illustrated in FIG. 5. Specifically, computer system 500 includes a bus 502 (FIG. 5) or other communication mechanism for communicating information, and a processor 503 coupled with bus 502 for processing information. According, such a processor 501 is programmed in some embodiments of the invention to execute the first command by modifying data in a portion of a LOB, without modifying data in a remainder of the LOB unrelated to the portion being modified.

Computer system 500 also includes a main memory 505, such as a random access memory (RAM) or other dynamic storage device, coupled to bus 502 for storing information and instructions to be executed by processor 503. Note that bus 502 of some embodiments implements each of buses 241, 261 and 221 illustrated in FIG. 2. Main memory 505 also may be used for storing temporary variables or other intermediate information during execution of instructions to be executed by processor 503. Computer system 500 further includes a read only memory (ROM) 508 or other static storage device coupled to bus 502 for storing static information and instructions for processor 503. A storage device 510, such as a magnetic disk or optical disk, is provided and coupled to bus 502 for storing information and instructions.

Computer system 500 may be coupled via bus 502 to a display 511, such as a cathode ray tube (CRT), for displaying information to a computer user. An input device 514, including alphanumeric and other keys, is coupled to bus 502 for communicating information and command selections to processor 503. Another type of user input device is cursor control 516, such as a mouse, a trackball, or cursor direction keys for communicating direction information and command selections to processor 503 and for controlling cursor movement on display 511. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 500 in response to processor 503 executing instructions programmed to perform the above-described acts and contained in main memory 505. Such instructions may be read into main memory 505 from another computer-readable medium, such as storage device 510. Execution of instructions contained in main memory 505 causes processor 503 to perform the process steps described herein. In alternative embodiments, hard-wired circuitry may be used in place of or in combination with software instructions to implement an embodiment of the type illustrated in FIGS. 3 and 4. Thus, embodiments of the invention are not limited to any specific combination of hardware circuitry and software.

The term "computer-readable storage medium" as used herein refers to any storage medium that participates in providing instructions to processor 503 for execution. Such a storage medium may take many forms, including but not limited to, non-volatile storage media, and volatile storage media, media. Non-volatile storage media includes, for example, optical or magnetic disks, such as storage device 510. Volatile storage media includes dynamic memory, such as main memory 505. Any such storage media may be used in an article of manufacture.

Common forms of computer-readable storage media include, for example, a floppy disk, a flexible disk, hard disk, magnetic tape, or any other magnetic medium, a CD-ROM, any other optical storage medium, punch cards, paper tape, any other physical medium with patterns of holes, a RAM, a PROM, and EPROM, a FLASH-EPROM, any other memory chip or cartridge, as described hereinafter, or any other storage medium from which a computer can read.

Figure 4:
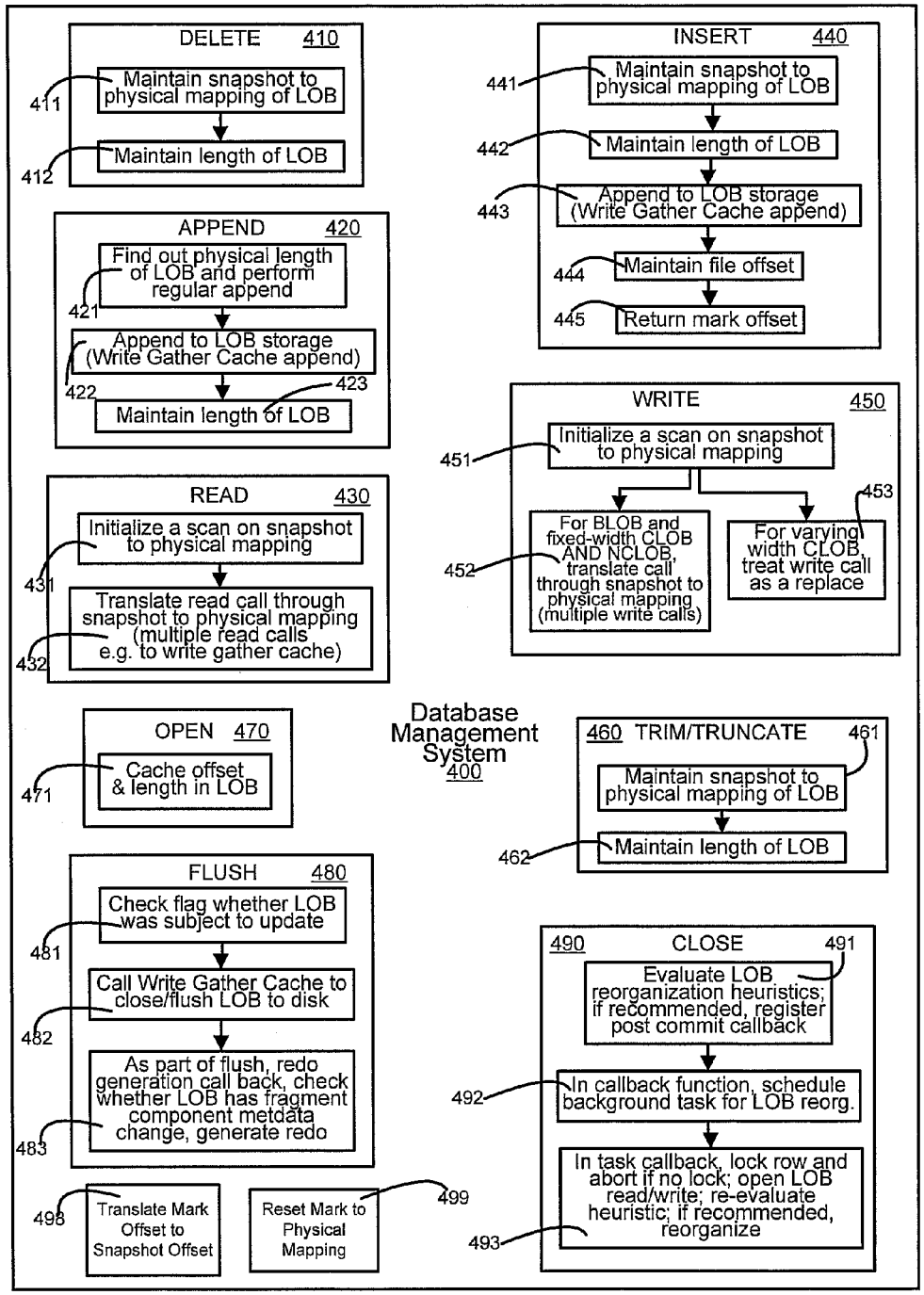
FIG. 4 illustrates, in flow charts, methods that are performed by a database management system (DBMS) of some embodiments of the invention, to implement certain illustrative commands, to operate on one or more intermediate portion(s) of a LOB that is accessible via a LOB column inside a relational database.

Various forms of computer readable storage media may be involved in carrying the above-described instructions to processor 503 to implement an embodiment of the type illustrated in FIG. 4. For example, such instructions may initially be carried on a magnetic disk of a remote computer. The remote computer can load such instructions into its dynamic memory and send the instructions over a telephone line using a modem. A modem local to computer system 500 can receive such instructions on the telephone line and use an infra-red transmitter to convert the received instructions to an infra-red signal. An infra-red detector can receive the instructions carried in the infra-red signal and appropriate circuitry can place the instructions on bus 502. Bus 502 carries the instructions to main memory 505, in which processor 503 executes the instructions contained therein. The instructions held in main memory 505 may optionally be stored on storage device 510 either before or after execution by processor 503.

Computer system 500 also includes a communication interface 518 coupled to bus 502. Communication interface 518 provides a two-way data communication coupling to a network link 520 that is connected to a local network 522. Local network 522 may interconnect multiple computers (as described above). For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network 528 now commonly referred to as the "Internet". Local network 522 and network 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a code bundle through Internet 528, ISP 526, local network 522 and communication interface 518. In accordance with the invention, one such downloaded set of instructions implements an embodiment of the type illustrated in FIG. 4. The received set of instructions may be executed by processor 503 as received, and/or stored in storage device 510, or other non-volatile storage for later execution. In this manner, computer system 500 may obtain the instructions in the form of a carrier wave. Accordingly, an article of manufacture may include a storage medium or alternatively may include a carrier wave, as both are manufactured by humans.

Numerous modifications and adaptations of the embodiments described herein will be apparent to the skilled artisan in view of the disclosure. Accordingly numerous such modifications and adaptations are encompassed by the attached claims.

In several embodiments, a computer-implemented method performs operations in a structured query language (SQL) compliant database management system (DBMS) that allows storage of large objects (LOBs) of unknown structure. Specifically, in such embodiments, a server receives an SQL statement that includes a first command to update inside a large object (LOB) a portion that is smaller than all of the LOB and the server executes the first command by modifying data of the portion without modifying data in a remainder of the LOB unrelated to the portion. During execution of the first command, the server modifies metadata to be used to read the LOB, based on where the portion is located within the LOB, and in response to a second command, the server uses the metadata to read data from the LOB and output the read data to a client.

When the first command is to insert new data into the LOB at a location not at an end of the LOB, during execution of the first command in some embodiments, the server described in the previous paragraph appends the new data to the end of the LOB; and the server modifies metadata based on the location. When the first command is to delete existing data from the LOB at a location not at an end of the LOB, the server modifies metadata based on the location. In several embodiments, the metadata includes a map that maps an offset ("snapshot offset") in the first command to another offset ("physical offset") in the LOB at which the portion is located; and during modification of the metadata, the server modifies the map.

Several embodiments of the type described herein make the cost of input-output (IO) for changes to a LOB linear to the size of the change (delta), not linear to the size of the LOB. Thus the name delta update is used in some embodiments. In such embodiments, at the time of update, user needs to specify which LOB to update, and provide the delta (diff) for the update. In these embodiments, an API takes input size roughly the same as the delta size and the delta operation is performed by a list of change atoms of the type described above. As noted above, a replace atom of these embodiments specifies these fields: (replace interval start position, replace interval length or end position, new data length, new data). In these embodiments, each atom specifies an operation to replace a piece of data (contiguous bytes called replace interval) inside the LOB with some new data. In such embodiments, the insert, append and delete atoms are simply special cases of the replace atom as follows: insert/append atom is obtained when the replace atom's interval length is 0; a delete atom is obtained when new data length is 0. Such embodiments may further support a move atom that specifies the following fields: (source start position, source length, destination position); the move atom specifies an operation to move a piece of data inside the LOB. The piece of data being moved is called move interval.

In some embodiments, reorganization of a LOB may occur automatically during an update operation when the server evaluates that a reorganization operation is more beneficial than a delta update operation. The reorganization operation of certain embodiments is fully transparent to the client, although the update operation appears slow to the client. A heuristic used by the server of some embodiments to decide for reorganization is based on delta size (both in the absolute terms and relative to the LOB size), auxiliary mapping size and one or more read response time statistics for the LOB segment. The specific heuristic used to trigger LOB reorganization is not a critical aspect of the invention.

Several embodiments provide backward compatibility in usage of traditional LOB API such as append, trim, truncate, write, together with the new update API. In addition, in these embodiments, the new update API is allowed to be called on any LOB with the new LOCAL storage type, including those stored in row. In several embodiments, LOB delta update is supported for combinatorial sharing & compression, and for versioning. Also, some embodiments support LOB delta update for various objects such as CLOB, NCLOB (both fixed width character sets and varying width character sets). The API for CLOB and NCLOB in several embodiments is same as BLOB, except that the offset fields are interpreted as character offsets.

The following ATTACHMENT A describes an application programming interface (API) for the delta update operation (in a package called "dbms_lob") as used in a relational database, in some illustrative embodiments. The FUNCTION fragment_insert is used to insert given data (limited to 32K) into the LOB at the given offset; when offset is not set, or is set to −1, the last offset written to (or the end of lob if not indicated) is used as the offset. This function returns a negative value on error and throws exception. The PROCEDURE fragment_delete is used to delete the data at the given offset for the given length from the LOB; this procedure throws exceptions on error. The PROCEDURE fragment_move is used to move the length bytes from the given offset to the new offset given; this procedure throws exceptions on error. The FUNCTION fragment_replace is used to replace the data at the given offset with the given data (not to exceed 32 k); when offset is not set, or is set to −1, the last offset read from or written to is used as the offset. This function is equivalent of performing the procedure fragment_delete for replace_len bytes at offset and then the function fragment_insert for data_length bytes at the same offset. This function fragment_replace returns negative value on error and throws an exception. The following ATTACHMENT B describes an illustrative example using SQL statements. Note that in some embodiments, an API called Oracle Call Interface (OCI) for the database ORACLE is also extended in a similar manner, as will be apparent to the skilled artisan in view of this disclosure.

ATTACHMENT A

```
FUNCTION fragment_insert(
    lob_loc      IN OUT NOCOPY BLOB,
    amount       IN         INTEGER,
    offset       IN         INTEGER,
    buffer       IN         RAW
                 ) RETURN INTEGER;
PROCEDURE fragment_delete(
    lob_loc      IN OUT NOCOPY BLOB,
    amount       IN         INTEGER,
    offset       IN         INTEGER
);
PROCEDURE fragment_move(
    lob_loc               IN OUT NOCOPY BLOB,
    amount                IN         INTEGER,
    src_offset            IN         INTEGER,
    dest_offset           IN         INTEGER
);
FUNCTION fragment_replace(
    lob_loc      IN OUT NOCOPY BLOB,
    old_amount   IN         INTEGER,
    new_amount   IN         INTEGER,
    offset       IN         INTEGER,
    buffer       IN         RAW
) RETURN INTEGER;
```

ATTACHMENT B

```
CREATE TABLE tklofrTable (id NUMBER, content CLOB)
    LOB (content) STORE AS (local);
INSERT INTO tklofrTable values (1, 'Delta Update DBMS_LOB API --
Testing ');
INSERT INTO tklofrTable values (2, 'Delta Update DBMS_LOB API --
Testing ');
COMMIT;
SELECT * FROM tklofrTable;
DECLARE
    lob_handle CLOB;
    amount INTEGER;
    amount_old INTEGER;
    offset INTEGER;
    offset_src INTEGER;
    buffer VARCHAR2(8);
    buffer_old VARCHAR2(5);
    returnval INTEGER;
    buffer_txt VARCHAR2(255);
BEGIN
    buffer := 'Fragment';
    buffer_old := 'Delta';
    SELECT content INTO lob_handle
        FROM tklofrTable
        WHERE id = 2 FOR UPDATE;
    -- Replace Atom
    amount_old := 5;
    amount := 8;
    offset := 1;
    returnval := dbms_lob.fragment_replace(lob_handle, amount_old,
amount, offset, buffer);
    -- Move Atom
    amount := 13;
    offset := 1;
    offset_src := 30;
    dbms_lob.fragment_move(lob_handle, amount, offset_src, offset);
```

-continued

ATTACHMENT B

```
    -- Delete Atom
    amount := 8;
    offset := 14;
    dbms_lob.fragment_delete(lob_handle, amount, offset);
    -- Intermediate Move Atom to make the result the same before
    amount := 21;
    offset := 1;
    offset_src := 14;
    dbms_lob.fragment_move(lob_handle, amount, offset_src, offset);
    -- Insert Atom
    amount := 5;
    offset := 1;
    returnval := dbms_lob.fragment_insert(lob_handle, amount, offset,
buffer_old);
    COMMIT;
END;
/
SELECT * FROM tklofrTable;
```

What is claimed is:

1. A computer-readable storage medium comprising instructions for a computer to perform operations in a structured query language (SQL) compliant database management system (DBMS) that allows storage of large objects (LOBs) of unknown structure, the instructions comprising:

instructions to receive an SQL statement that includes a first command to update inside a block in a large object (LOB) in the DBMS, a portion that is smaller than the block;

instructions to execute the first command by modifying data of the portion without movement of data in a remainder of the block unrelated to the portion;

instructions to modify metadata that maps a first offset identifying the portion in the block to a second offset at which data of the portion is located within the block; and instructions responsive to a second command, to use the metadata obtained by said modifying to translate a third offset in the second command, use the result of translation to read data from the LOB and output the read data from the computer.

2. The computer-readable storage medium of claim 1 wherein:

the first offset identifies an intermediate location that is located between a beginning of the LOB and an end of the LOB;

the computer-readable storage medium comprises instructions to append the new data to a new location that is located at the end of the LOB; and the computer-readable storage medium comprises instructions to modify the metadata to at least map the first offset identifying the intermediate location to the second offset identifying the new location.

3. The computer-readable storage medium of claim 1 wherein:

the first command is to delete existing data from the LOB.

4. The computer-readable storage medium of claim 1 further comprising:

instructions to return as the first offset, a location of data inserted into the LOB, when the first command is to insert; and instructions to read from the LOB, the data related to the portion even if the remainder of the LOB is modified prior to the second command, when the second command supplies the first offset.

5. The computer-readable storage medium of claim 4 wherein:
- a plurality of additional offsets identify a corresponding plurality of additional portions of the LOB; and
- said first offset and said plurality of additional offsets are related to one another in a monotonically changing sequence based on time of insertion of said portion and said plurality of additional portions.

6. A computer programmed with software of a relational database to perform operations in a structured query language (SQL) that allows storage of large objects (LOBs) of unknown structure, the computer comprising:
- means for receiving an SQL statement that includes a first command to update inside a block in a large object (LOB), a portion that is smaller than the block;
- a processor coupled to the means for receiving, the processor programmed to execute the first command by modifying data of the portion without moving data in a remainder of the LOB unrelated to the portion;
- means, coupled to the means for receiving, for modifying metadata that maps a first offset identifying the portion in the block to a second offset at which data of the portion is located within the block;
- means for using the metadata to read data from the LOB and output the read data to a client; and
- a memory wherein said LOB and said metadata is stored, said memory being coupled to each of said means and to said processor.

7. The computer of claim 6 wherein:
- the first command is to insert new data into the LOB at a location not at an end of the LOB;
- the processor is programmed to append the new data to the end of the LOB in said memory; and
- the processor is programmed to modify metadata in said memory, based on the location.

8. The computer of claim 6 wherein:
- the first command is to delete existing data from the LOB at a location not at an end of the LOB; and
- the processor is programmed to modify metadata based on the location.

9. The computer of claim 6 wherein:
- when the first command is to insert, the processor is programmed to return the first offset; and
- when the second command supplies said first offset, the processor is programmed to read from the LOB, the data related to the portion even if the remainder of the LOB is modified prior to the second command.

10. A computer-implemented method for performing operations in a structured query language (SQL) compliant database management system (DBMS) that allows storage of large objects (LOBs) of unknown structure, the method comprising:
- receiving an SQL statement that includes a first command to update inside a block in a large object (LOB) in the DBMS, a portion that is smaller than the block;
- automatically executing the first command by modifying data of the portion without movement of data in a remainder of the block unrelated to the portion;
- during execution of the first command, a processor modifying metadata that maps a first offset identifying the portion in the block to a second offset at which data of the portion is located within the block; and
- in response to a second command, automatically using the metadata obtained by said modifying to translate a third offset in the second command, use the result of translation to read data from the LOB, and output the read data.

11. The method of claim 10 wherein:
- the first offset identifies an intermediate location that is located between a beginning of the LOB and an end of the LOB;
- during execution of the first command, appending the new data to a new location that is located at the end of the LOB; and
- the processor modifying the metadata to at least map the first offset identifying the intermediate location to the second offset identifying the new location.

12. The method of claim 10 wherein:
the first command is to delete existing data from the LOB.

13. The method of claim 10 further comprising:
- returning as the first offset, a location of data inserted into the LOB, when the first command is to insert; and
- reading from the LOB, the data related to the portion even if the remainder of the LOB is modified prior to the second command, when the second command supplies the first offset.

14. The method of claim 13 wherein:
- a plurality of additional offsets identify a corresponding plurality of additional portions of the LOB; and
- said first offset and said plurality of additional offsets are related to one another in a monotonically changing sequence based on time of insertion of said portion and said plurality of additional portions.

* * * * *

UNITED STATES PATENT AND TRADEMARK OFFICE
CERTIFICATE OF CORRECTION

| | | |
|---|---|---|
| PATENT NO. | : 7,761,411 B2 | Page 1 of 1 |
| APPLICATION NO. | : 11/781103 | |
| DATED | : July 20, 2010 | |
| INVENTOR(S) | : Shaoyu Wang et al. | |

It is certified that error appears in the above-identified patent and that said Letters Patent is hereby corrected as shown below:

In column 10, line 24, delete "media, media." and insert -- media. --, therefor.

Signed and Sealed this

Twenty-sixth Day of April, 2011

David J. Kappos
*Director of the United States Patent and Trademark Office*